United States Patent
Pandit et al.

(10) Patent No.: US 8,553,781 B2
(45) Date of Patent: Oct. 8, 2013

(54) METHODS AND APPARATUS FOR DECODED PICTURE BUFFER (DPB) MANAGEMENT IN SINGLE LOOP DECODING FOR MULTI-VIEW VIDEO

(75) Inventors: Purvin Bibhas Pandit, Franklin Park, NJ (US); Peng Yin, Plainsboro, NJ (US)

(73) Assignee: Thomson Licensing, Boulogne-Billancourt ( * ) Notice: Subject to any disclaimer, the term of this patent is extended or adjusted under 35 U.S.C. 154(b) by 776 days.

(21) Appl. No.: 12/291,230

(22) Filed: Nov. 7, 2008

(65) Prior Publication Data

US 2009/0147850 A1 Jun. 11, 2009

Related U.S. Application Data

(60) Provisional application No. 61/012,226, filed on Dec. 7, 2007.

(51) Int. Cl.
- *H04N 7/12* (2006.01)
- *H04N 11/02* (2006.01)
- *H04N 11/04* (2006.01)

(52) U.S. Cl.
USPC ............ 375/240.25; 375/240.12; 375/240.13; 375/240.14; 375/240.15; 348/394.1; 348/411.1; 348/412.1; 348/415.1; 382/233; 382/238

(58) Field of Classification Search
USPC ........... 375/240.01–240.29; 725/88; 386/343; 348/394.1, 411.1, 412.1, 415.1; 382/233, 238

See application file for complete search history.

(56) References Cited

U.S. PATENT DOCUMENTS

| | | | |
|---|---|---|---|
| 6,823,131 B2 * | 11/2004 | Abelard et al. | 386/343 |
| 8,050,328 B2 * | 11/2011 | Iguchi et al. | 375/240.25 |
| 2002/0067768 A1 * | 6/2002 | Hurst | 375/240.03 |
| 2003/0079229 A1 * | 4/2003 | Lin | 725/88 |
| 2008/0117985 A1 * | 5/2008 | Chen et al. | 375/240.26 |
| 2009/0116558 A1 * | 5/2009 | Chen et al. | 375/240.16 |
| 2010/0104014 A1 * | 4/2010 | Koo et al. | 375/240.15 |

OTHER PUBLICATIONS

A. Vetro: "Text of ISO/IEC 14496-10:200X/PDAM1 Multiview Video Coding"; ISO/IEC 2007; Lausanne, Switzerland, Jul. 2007 ISO/IEC JTC 1/SC 29/WG 11 N9213; pp. 1-39.

P. Merkle: "Efficient Prediction Structures for Multi-view Video Coding"; IEEE; pp. 1-13.

H-S Koo et al.: "MVC Motion Skip Mode"; Joint Video Team of ISO/IEC MPEG & ITU-T VCEG (ISO/IEC JTC1/SC29/WG11 and ITU-T SG16 Q.6, $23^{rd}$ meeting: San Jose, CA USA Apr. 21-27, 2007; pp. 1-13.

A. Vetro et al.: "Joint Draft 3.0 on Multiview Video Coding"Joint Video Team of ISO/IEC MPEG & ITU-T VCEG (ISO/IEC JTC1/SC29/WG11 and ITU-T SG16 Q.6, 23rd meeting: San Jose, CA USA Apr. 21-27, 2007; pp. 1-39.

* cited by examiner

*Primary Examiner* — Sath V Perungavoor
*Assistant Examiner* — Nathnael Aynalem
(74) *Attorney, Agent, or Firm* — Robert D. Shedd; Guy H. Eriksen

(57) ABSTRACT

There are provided methods and apparatus for decoded picture buffer (DPB) management in single loop decoding for multi-view video. An apparatus includes a decoder (200) for decoding a picture corresponding to at least one view of at least two views of multi-view video content. The picture is decoded in support of decoded picture buffer management for single loop decoding using inter-view prediction.

18 Claims, 5 Drawing Sheets

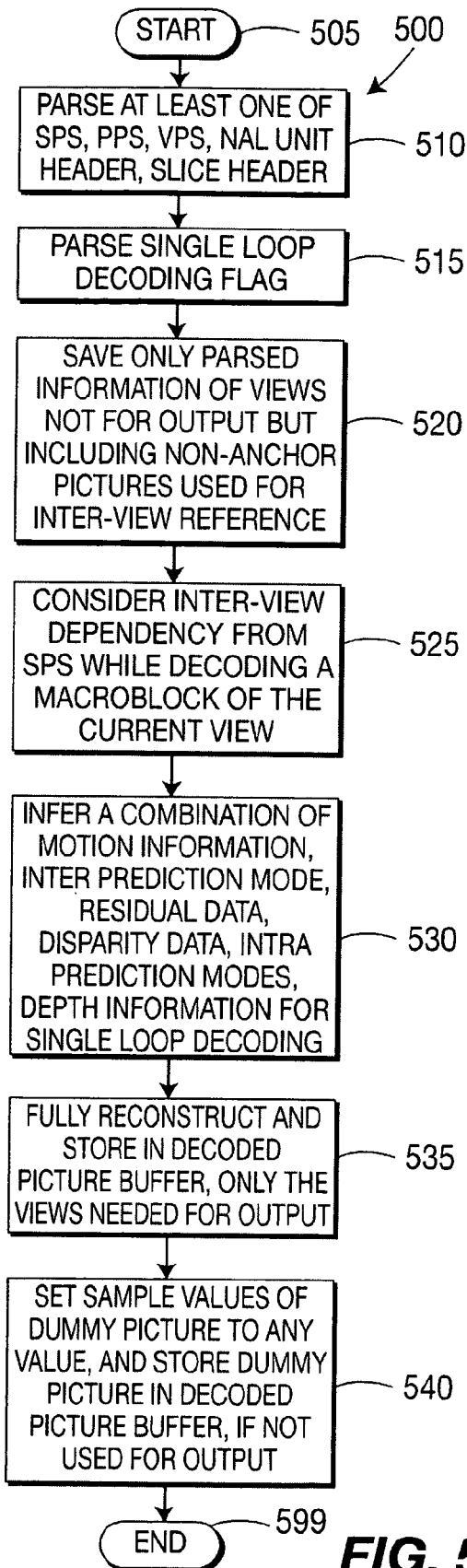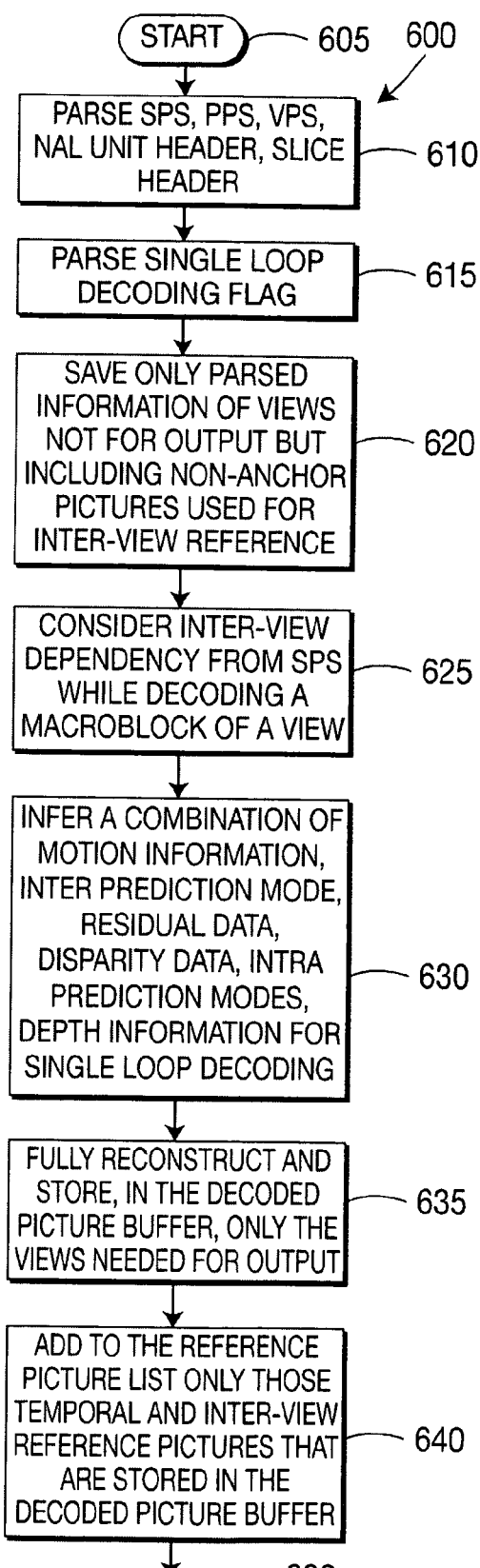

METHODS AND APPARATUS FOR DECODED PICTURE BUFFER (DPB) MANAGEMENT IN SINGLE LOOP DECODING FOR MULTI-VIEW VIDEO

CROSS-REFERENCE TO RELATED APPLICATIONS

This application claims the benefit of U.S. Provisional Application Ser. No. 61/012,226, filed 7 Dec. 2007, which is incorporated by reference herein in its entirety.

TECHNICAL FIELD

The present principles relate generally to video encoding and decoding and, more particularly, to methods and apparatus for decoded picture buffer (DPB) management in single loop decoding for multi-view video.

BACKGROUND

Multi-view video coding (MVC) is the compression framework for the encoding of multi-view sequences. A multi-view video coding sequence is a set of two or more video sequences that capture the same scene from a different view point.

Motion skip mode has been proposed to improve the coding efficiency for multi-view video coding. A basis of this proposal is the assumption that there is a similarity with respect to the motion between the neighboring two views, therefore coding efficiency can be achieved by exploiting this redundancy. Motion skip mode infers the motion information, such as macroblock type, motion vector, and reference indices, directly from the corresponding macroblock in the neighboring view at the same temporal instant. The method is decomposed into two stages, namely a search for the corresponding macroblock and a derivation of motion information. In the first stage, a global disparity vector (GDV) is used to indicate the corresponding position (macroblock) in the picture of a neighboring view. The global disparity vector is measured by the macroblock-size of units between the current picture and the picture of the neighboring view. The global disparity vector can be estimated and decoded periodically such as, for example, every anchor picture. In that case, the global disparity vector of a non-anchor picture is interpolated using the recent global disparity vectors from the anchor picture. In the second stage, the motion information is derived from the corresponding macroblock in the picture of the neighboring view, and the motion information is copied in order to be applied to the current macroblock. Motion skip mode is disabled in the case when the current macroblock is in a picture of the base view or is in an anchor picture, because the proposed method exploits the picture from a neighboring view to present another way for the inter prediction process.

To signal the use of motion skip mode at the encoder to the decoder, a flag referred to as motion_skip_flag is included in the head of macroblock layer syntax for multi-view video coding. If motion_skip_flag is turned on, then the current macroblock derives macroblock type, motion vector, and reference indices from the corresponding macroblock in the neighboring view. Motion skip mode needs to know which reference is the inter-view reference for the current picture in order to infer the motion information, such as macroblock type, motion vector, and reference indices, directly from the corresponding macroblock in the neighboring view at the same temporal instant, but does not predict any pixel value from the inter-view reference picture.

SUMMARY

These and other drawbacks and disadvantages of the prior art are addressed by the present principles, which are directed to methods and apparatus for decoded picture buffer (DPB) management in single loop decoding for multi-view video.

According to an aspect of the present principles, there is provided an apparatus. The apparatus includes a decoder for decoding a picture corresponding to at least one view of at least two views of multi-view video content. The picture is decoded in support of decoded picture buffer management for single loop decoding using inter-view prediction.

According to another aspect of the present principles, there is provided a method. The method includes decoding a picture corresponding to at least one view of at least two views of multi-view video content. The picture is decoded in support of decoded picture buffer management for single loop decoding using inter-view prediction.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIG. 5 is a flow diagram for an exemplary method for decoding multi-view video content, in accordance with an embodiment of the present principles; and FIG. 6 is a flow diagram for another exemplary method for decoding multi-view video content, in accordance with an embodiment of the present principles.

DETAILED DESCRIPTION

Figure 1:
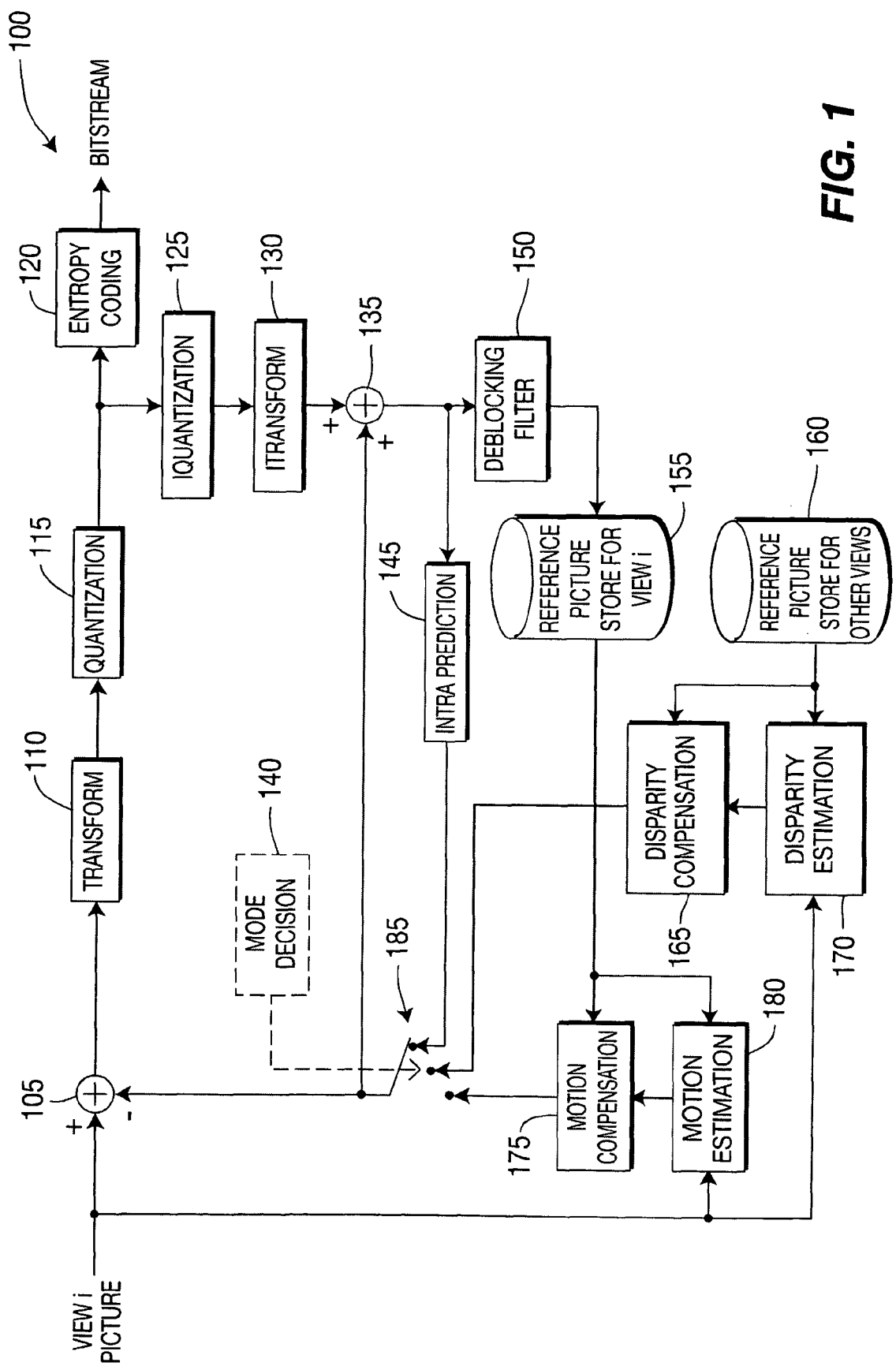
FIG. 1 is a block diagram for an exemplary Multi-view Video Coding (MVC) encoder to which the present principles may be applied, in accordance with an embodiment of the present principles.

The present principles are directed to methods and apparatus for decoded picture buffer (DPB) management in single loop decoding for multi-view video.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

As used herein, "high level syntax" refers to syntax present in the bitstream that resides hierarchically above the macroblock layer. For example, high level syntax, as used herein, may refer to, but is not limited to, syntax at the Supplemental Enhancement Information (SEI) level, Picture Parameter Set (PPS) level, Sequence Parameter Set (SPS) level, View Parameter Set (VPS) level, Network Abstraction Layer (NAL) unit header level, and slice header level.

Moreover, as interchangeably used herein, "cross-view" and "inter-view" both refer to pictures that belong to a view other than a current view.

It is to be appreciated that while one or more embodiments of the present principles are described herein with respect to the multi-view video coding extension of the MPEG-4 AVC standard, the present principles are not limited to solely this extension and/or this standard and, thus, may be utilized with respect to other video coding standards, recommendations, and extensions thereof, while maintaining the spirit of the present principles.

Turning to FIG. 1, an exemplary Multi-view Video Coding (MVC) encoder is indicated generally by the reference numeral 100. The encoder 100 includes a combiner 105 having an output connected in signal communication with an input of a transformer 110. An output of the transformer 110 is connected in signal communication with an input of quantizer 115. An output of the quantizer 115 is connected in signal communication with an input of an entropy coder 120 and an input of an inverse quantizer 125. An output of the inverse quantizer 125 is connected in signal communication with an input of an inverse transformer 130. An output of the inverse transformer 130 is connected in signal communication with a first non-inverting input of a combiner 135. An output of the combiner 135 is connected in signal communication with an input of an intra predictor 145 and an input of a deblocking filter 150. An output of the deblocking filter 150 is connected in signal communication with an input of a reference picture store 155 (for view i). An output of the reference picture store 155 is connected in signal communication with a first input of a motion compensator 175 and a first input of a motion estimator 180. An output of the motion estimator 180 is connected in signal communication with a second input of the motion compensator 175

An output of a reference picture store 160 (for other views) is connected in signal communication with a first input of a disparity/illumination estimator 170 and a first input of a disparity/illumination compensator 165. An output of the disparity/illumination estimator 170 is connected in signal communication with a second input of the disparity/illumination compensator 165.

An output of the entropy decoder 120 is available as an output of the encoder 100. A non-inverting input of the combiner 105 is available as an input of the encoder 100, and is connected in signal communication with a second input of the disparity/illumination estimator 170, and a second input of the motion estimator 180. An output of a switch 185 is connected in signal communication with a second non-inverting input of the combiner 135 and with an inverting input of the combiner 105. The switch 185 includes a first input connected in signal communication with an output of the motion compensator 175, a second input connected in signal communication with an output of the disparity/illumination compensator 165, and a third input connected in signal communication with an output of the intra predictor 145.

A mode decision module 140 has an output connected to the switch 185 for controlling which input is selected by the switch 185.

Figure 2:
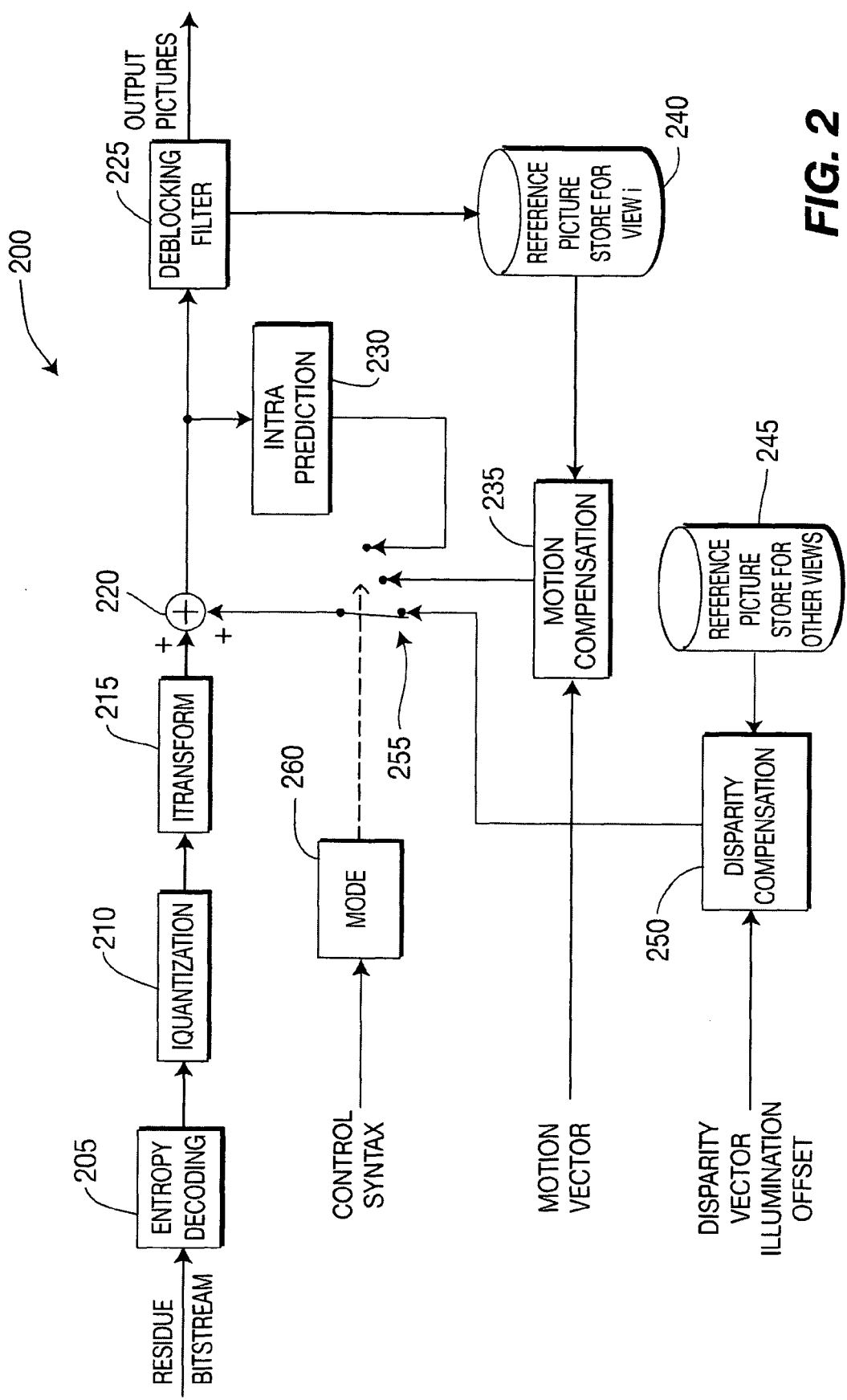
FIG. 2 is a block diagram for an exemplary Multi-view Video Coding (MVC) decoder to which the present principles may be applied, in accordance with an embodiment of the present principles.

Turning to FIG. 2, an exemplary Multi-view Video Coding (MVC) decoder is indicated generally by the reference numeral 200. The decoder 200 includes an entropy decoder 205 having an output connected in signal communication with an input of an inverse quantizer 210. An output of the inverse quantizer is connected in signal communication with an input of an inverse transformer 215. An output of the inverse transformer 215 is connected in signal communication with a first non-inverting input of a combiner 220. An output of the combiner 220 is connected in signal communication with an input of a deblocking filter 225 and an input of an intra predictor 230. An output of the deblocking filter 225 is connected in signal communication with an input of a reference picture store 240 (for view i). An output of the reference picture store 240 is connected in signal communication with a first input of a motion compensator 235.

An output of a reference picture store 245 (for other views) is connected in signal communication with a first input of a disparity/illumination compensator 250.

An input of the entropy coder 205 is available as an input to the decoder 200, for receiving a residue bitstream. Moreover, an input of a mode module 260 is also available as an input to the decoder 200, for receiving control syntax to control which input is selected by the switch 255. Further, a second input of the motion compensator 235 is available as an input of the decoder 200, for receiving motion vectors. Also, a second input of the disparity/illumination compensator 250 is available as an input to the decoder 200, for receiving disparity vectors and illumination compensation syntax.

An output of a switch 255 is connected in signal communication with a second non-inverting input of the combiner 220. A first input of the switch 255 is connected in signal communication with an output of the disparity/illumination compensator 250. A second input of the switch 255 is connected in signal communication with an output of the motion compensator 235. A third input of the switch 255 is connected in signal communication with an output of the intra predictor 230. An output of the mode module 260 is connected in signal communication with the switch 255 for controlling which input is selected by the switch 255. An output of the deblocking filter 225 is available as an output of the decoder.

As noted above, the present principles are directed to methods and apparatus for decoded picture buffer (DPB) management in single loop decoding for multi-view video.

In multi-view video coding (MVC), in order to decrease the coding complexity, an option is to enable single loop decoding. In one example of single loop decoding, only the anchor pictures use completely reconstructed pictures as references for inter-view prediction while the non-anchor pictures do not use reconstructed pictures as reference for inter-view prediction.

In accordance with one or more embodiments of the present principles, we improve the coding efficiency for the non-anchor pictures by utilizing inter-view prediction such that the inter-view prediction infers certain data from the neighboring views without the need to completely reconstruct the neighboring views. In an embodiment of the present principles, we indicate the neighboring reference views by the Sequence Parameter Sets (SPS) syntax shown in TABLE 1. In doing so, we note that the inter-view reference concept in single loop decoding in accordance with the present principles is different, since these inter-view references are not used for pixel prediction, but rather we use parsed and decoded syntax.

TABLE 1

| seq_parameter_set_mvc_extension( ) { | C | Descriptor |
|---|---|---|
| num_views_minus_1 | | ue(v) |
| for(i = 0; i <= num_views_minus_1; i++) | | |
|   view_id[i] | | ue(v) |
| for(i = 0; i <= num_views_minus_1; i++) { | | |
|   num_anchor_refs_l0[i] | | ue(v) |
|   for( j = 0; j < num_anchor_refs_l0[i]; j++ ) | | |
|     anchor_ref_l0[i][j] | | ue(v) |
|   num_anchor_refs_l1[i] | | ue(v) |
|   for( j = 0; j < num_anchor_refs_l1[i]; j++ ) | | |
|     anchor_ref_l1[i][j] | | ue(v) |
| } | | |
| for(i = 0; i <= num_views_minus_1; i++) { | | |
|   num_non_anchor_refs_l0[i] | | ue(v) |
|   for( j = 0; j < num_non_anchor_refs_l0[i]; j++ ) | | |
|     non_anchor_ref_l0[i][j] | | ue(v) |
|   num_non_anchor_refs_l1[i] | | ue(v) |
|   for( j = 0; j < num_non_anchor_refs_l1[i]; j++ ) | | |
|     non_anchor_ref_l1[i][j] | | ue(v) |
| } | | |
| } | | |

Thus, in contrast to the prior art, the present principles advantageously avoid the requirement of having to completely reconstruct an inter-view reference for prediction in multi-view video coding. However, the reference view not being fully constructed raises a problem for decoded picture buffer (DPB) management. Moreover, we should also consider the case where the reference view is needed for output. This will have an implication in decoded picture buffer management, including the decoded picture buffer marking process, and reference picture list construction.

Thus, in accordance with one or more embodiments of the present principles, we disclose novel decoded picture buffer management approaches to support single loop decoding for multi-view video coding. To decode some target views using single loop decoding, we do not require reconstructing the reference view completely (i.e., pixel data). Thus, only certain information from the reference view needs to be inferred and used for the target views, thus saving memory and complexity.

Figure 3:
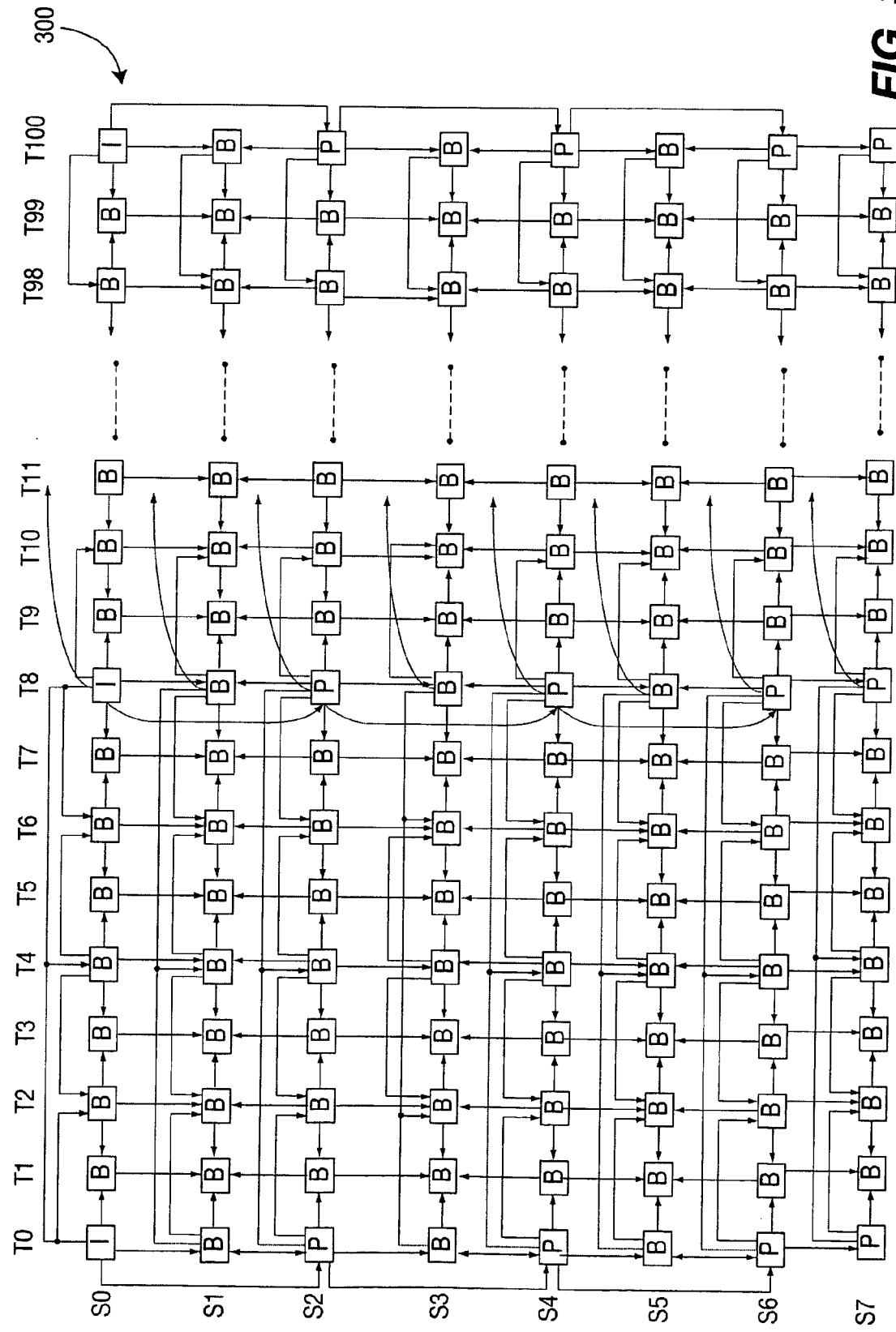
FIG. 3 is a diagram for an inter-view-temporal prediction structure based on the MPEG-4 AVC standard, using bi-predictive pictures, in accordance with an embodiment of the present principles.

The current version of the multi-view video coding specification being developed requires that all views be completely reconstructed. Reconstructed views can then be used as inter-view references. FIG. 3 is a diagram for an inter-view-temporal prediction structure based on the MPEG-4 AVC standard, using bi-predictive pictures, in accordance with an embodiment of the present principles.

As a result of the requirement that all views be completely reconstructed, each view must be completely decoded and stored in memory even though that view might not be output. This is not very efficient in terms of memory and processor utilization since it requires processor time to decode and memory to store decoded pictures for a view that does not need to be output.

Hence, an acceptable tradeoff between complexity and compression efficiency is the use of single loop decoding. In single loop decoding, only anchor pictures will use completely reconstructed pictures as references while the non-anchor pictures do not use reconstructed pictures as references. In order to improve the coding efficiency for the non-anchor pictures, inter-view prediction is used such that certain data from the neighboring views can be inferred without the need to completely reconstruct the neighboring views. One such tool is motion skip mode. The neighboring reference views are indicated by the sequence parameter set (SPS) syntax shown in TABLE 1.

In the single loop decoding mode, although the inter-view pictures are not used as inter-view references (and thus do not need to be fully reconstructed) the inter-view pictures are still indicated in the sequence parameter set as used for reference. This is because the current picture needs to know which inter-view pictures should be at least parsed (in order to obtain the motion information). This has a direct implication on the decoded picture buffer and reference list management since the decoded picture buffer stores decoded pictures.

To manage the decoded picture buffer, in an embodiment, we use a "dummy picture" in the decoded picture buffer, when the reference view is not used for output and does not need to be completely reconstructed for an inter-view reference. The sample value of "dummy picture" may be set to any value. A dummy picture is a picture that has been allocated memory by the decoder like any other reconstructed picture but will never be used a reference. Thus, the sample values or pixel values of such a picture can be initialized to any random values.

When the decoder is operated in single loop decoding mode, the decoder will create such a dummy picture for each inter-view reference picture needed for the current picture and place the dummy picture in the decoded picture buffer. The reference list initialization process can then place these pictures in the reference list. These will never be used as inter-view reference pictures for disparity compensation in the decoding process but only the parsed values (such as motion information) of the picture will be used. The advantage of this approach is that we do not need to change the specification to manage the decoded picture buffer for single loop decoding.

In another embodiment, we note that inter-view reference views that are not to be output may be indicated by high level syntax (e.g., in an SEI message, a sequence parameter set, and/or conveyed at the system level). In this embodiment, if the reference view as indicated in high level syntax is not output, then the non-anchor pictures for the reference view do not need to be completely reconstructed for inter-view reference. This implies that we do not need to store the non-anchor pictures (for the reference view that is not to be output) in the decoded picture buffer and, thus, the non-anchor pictures will not be added to the reference list. Although it should be noted that in this case the parsed and decoded syntax of the inter-view reference pictures may still be used as predictions for the current view.

If the reference view needs to be fully constructed (e.g., for output), only then will the non-anchor pictures be stored in the decoded picture buffer as references. If the reference view is stored as a reference, the reference view may be added into the reference list. Thus in this embodiment we specify whether the inter-view picture is placed in the decoded picture buffer or not based on whether this view needs to be fully reconstructed (e.g. for output). No dummy picture is placed as in the previous embodiment and a different process is specified to handle such pictures.

It is to be appreciated that although the embodiment is described with respect to the use of non-anchor pictures, the present principles may also be readily applied to anchor pictures. That is, given the teachings of the present principles provided herein, one of ordinary skill in this and related arts will readily appreciate that the preceding embodiment may be implemented with respect to non-anchor pictures and/or anchor pictures, while maintaining the-spirit of the present principles.

Figure 4:
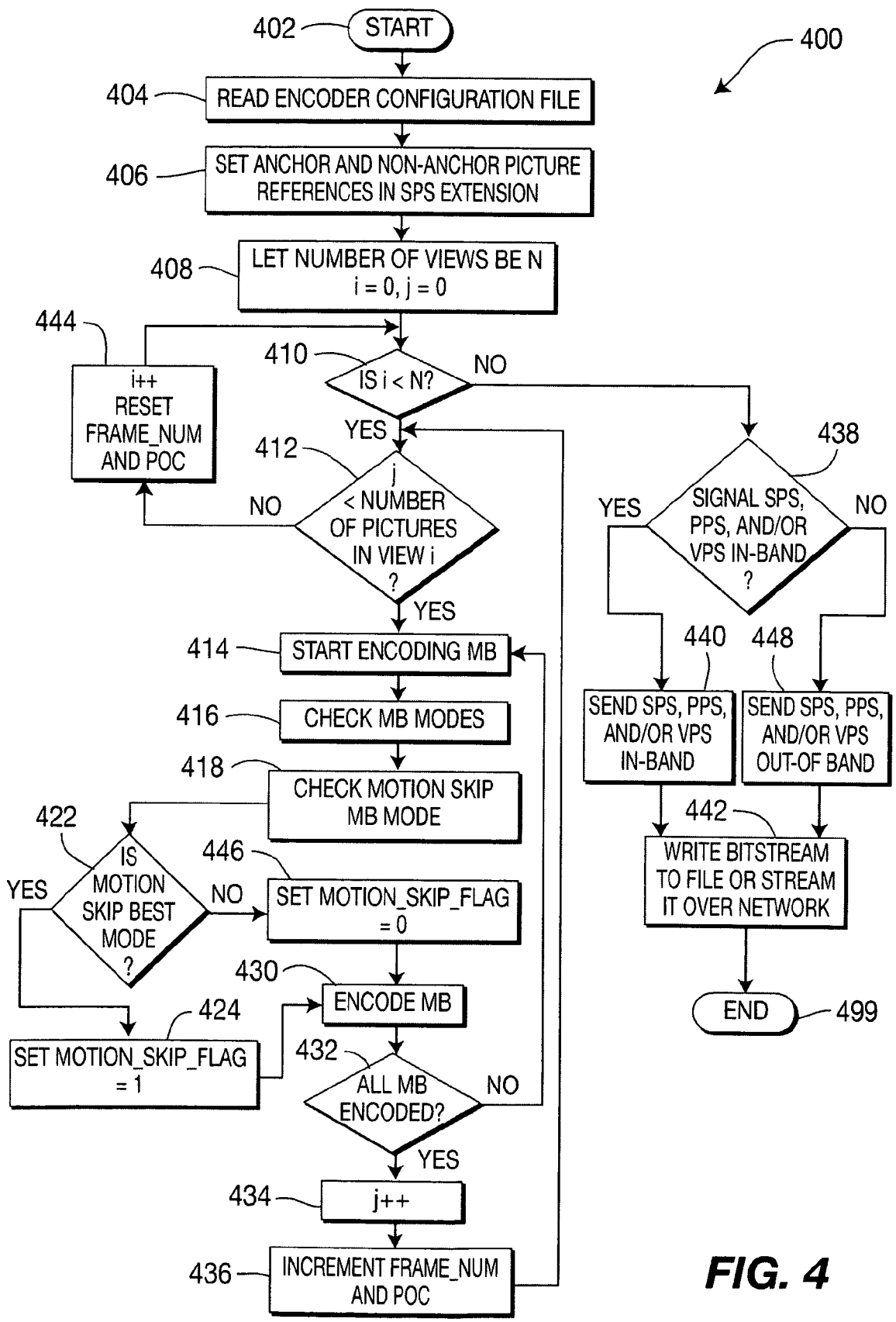
FIG. 4 is a flow diagram for an exemplary method for encoding multi-view video content, in accordance with an embodiment of the present principles.

Turning to FIG. 4, an exemplary method for encoding macroblocks is indicated generally by the reference numeral 400.

The method 400 includes a start block 402 that passes control to a function block 404. The function block 404 reads the encoder configuration file, and passes control to a function block 406. The function block 406 sets anchor and non-anchor picture references in a Sequence Parameter Set (SPS) extension, and passes control to a function block 408. The function block 408 lets the number of views be equal to a variable N, sets a variable i and a variable j equal to zero, and passes control to a decision block 410. The decision block 410 determines whether or not the current value of the variable i is less than the current value of the variable N. If so, then control is passed to a decision block 412. Otherwise, control is passed to a function block 438.

The decision block 412 determines whether or not the current value of the variable j is less than the number of pictures in view i. If so, then control is passed to a function block 414. Otherwise, control is passed to a function block 444.

The function block 414 starts encoding the current macroblock, and passes control to a function block 416. The function block 416 checks macroblock modes, and passes control to a function block 418. The function block 418 checks motion skip macroblock mode, and passes control to a decision block 422. The decision block 422 determines whether or not motion skip is the best mode. If so, then control is passed to a function block 424. Otherwise, control is passed to a function block 446.

The function block 424 sets motion_skip_flag equal to one, and passes control to a function block 430.

The function block 430 encodes the macroblock, and passes control to a decision block 432. The decision block 432 determines whether or not all macroblocks have been encoded. If so, then control is passed to a function block 434. Otherwise, control is returned to the function block 414.

The function block 434 increments the variable j, and passes control to a function block 436. The function block 436 increments frame_num and picture order count (POC), and returns control to the decision block 412.

The decision block 438 determines whether or not the SPS, PPS, and/or VPS (and/or any other syntax structure and/or syntax element that is used for the purposes of the present principles) are to be sent in-band. If so, then control is passed to a function block 440. Otherwise, control is passed to a function block 548.

The function block 440 sends the SPS, PPS, and/or VPS in-band, and passes control to a function block 442.

The function block 442 writes the bitstream to a file or streams the bitstream over a network, and passes control to an end block 499.

The function block 448 sends the SPS, PPS, and/or VPS out-of-band, and passes control to the function block 442.

The function block 444 increments the variable i, resets frame_num and POC, and returns control to the decision block 410.

The function block 446 sets motion_skip_flag equal to zero, and passes control to the function block 430.

Turning to FIG. 5, an exemplary method for decoding multi-view video content is indicated generally by the reference numeral 500. The method 500 includes a start block 505 that passes control to a function block 510. The function block 510 parses at least one of a sequence parameter set, a picture parameter set, a view parameter set, a Network Abstraction Layer (NAL) unit header, and a slice header, and passes control to a function block 515. The function block 515 parses the single loop decoding flag, and passes control to a function block 520. The function block 520 saves only the parsed information of views that are not needed for output but include non-anchor pictures that are used for inter-view reference, and passes control to a function block 525. The function block 525 considers the inter-view dependency from the sequence parameter set while decoding a macroblock of the current view, and passes control to a function block 530. The function block 530 infers a combination of motion information, inter prediction mode, residual data, disparity data, intra prediction modes, and depth information for single loop decoding, and passes control to a function block 535. The function block 535 fully reconstructs and stores in the decoded picture buffer only the views needed for output, and passes control to a function block 540. The function block 540 sets the sample values of a dummy picture to any value and stores the dummy picture if the corresponding picture for which the dummy picture was created is not used for output, and passes control to an end block 599.

Turning to FIG. 6, another exemplary method for decoding multi-view video content is indicated generally by the reference numeral 600. The method 600 includes a start block 605 that passes control to a function block 610. The function block 610 parses at least one of a sequence parameter set, a picture parameter set, a view parameter set, a Network Abstraction Layer (NAL) unit header, and a slice header, and passes control to a function block 615. The function block 615 parses the single loop decoding flag, and passes control to a function block 620. The function block 620 saves only the parsed information of views that are not needed for output but include non-anchor pictures that are used for inter-view reference, and passes control to a function block 625. The function block 625 considers the inter-view dependency from the sequence parameter set while decoding a macroblock of the current view, and passes control to a function block 630. The function block 630 infers a combination of motion information, inter prediction mode, residual data, disparity data, intra prediction modes, and depth information for single loop decoding, and passes control to a function block 635. The function block 635 fully reconstructs and stores in the decoded picture buffer only the views needed for output, and passes control to a function block 640. The function block 640 adds to the reference picture list only those temporal and inter-view reference pictures that are stored in the decoded picture buffer, and passes control to an end block 699.

A description will now be given of some of the many attendant advantages/features of the present invention, some of which have been mentioned above. For example, one advantage/feature is an apparatus having a decoder for decoding a picture corresponding to at least one view of at least two views of multi-view video content. The picture is decoded in support of decoded picture buffer management for single loop decoding using inter-view prediction.

Another advantage/feature is the apparatus having the decoder as described above, wherein the at least one view is a current view, the at least two views include a reference view with respect to the current view, and wherein the at least one view is capable of being reconstructed without a complete sample reconstruction of at least one of non-anchor pictures and anchor pictures of the reference view.

Yet another advantage/feature is the apparatus having the decoder as described above, wherein the decoder generates a dummy picture for storage in a decoded picture buffer in support of the decoded picture buffer management. The dummy picture is generated for a particular picture from among the at least one of non-anchor pictures and anchor pictures of the reference view.

Still another advantage/feature is the apparatus having the decoder that generates the dummy picture as described above, wherein a sample value of the dummy picture is settable to any value.

Moreover, another advantage/feature is the apparatus having the decoder that generates the dummy picture as described above, wherein the dummy picture is prohibited from use as an inter-view reference for the picture, and wherein only parsed syntax values corresponding to the dummy picture are used to decode the picture.

Further, another advantage/feature is the apparatus having the decoder as described above, wherein the decoder omits a particular inter-view reference picture for the picture from a reference picture list, when the picture is capable of being decoded without a complete sample reconstruction of the particular inter-view reference picture.

Also, another advantage/feature is the apparatus having the decoder that omits a particular inter-view reference picture for the picture from a reference picture list as described above, wherein the decoder determines whether the picture is capable of being decoded without the complete sample reconstruction of the particular inter-view reference picture based upon at least one high level syntax element.

Additionally, another advantage/feature is the apparatus having the decoder that omits a particular inter-view reference picture for the picture from a reference picture list as described above, wherein the decoder decodes the picture using decoded syntax of the inter-view reference picture as a prediction there for.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

What is claimed is:

1. An apparatus, comprising:
a decoder for decoding a picture corresponding to at least one view of at least two views of multi-view video content, wherein the picture is decoded in support of decoded picture buffer management for single loop decoding using inter-view prediction,
wherein said decoder generates a dummy picture for storage in a decoded picture buffer in support of the decoded picture buffer management, the dummy picture generated for a particular inter-view reference picture from among at least one of non-anchor pictures and anchor pictures of a reference view.

2. The apparatus of claim 1, wherein the at least one view is a current view, the at least two views include the reference view with respect to the current view, and wherein the at least one view is capable of being reconstructed without a complete sample reconstruction of at least one of the non-anchor pictures and the anchor pictures of the reference view.

3. The apparatus of claim 1, wherein a sample value of the dummy picture is settable to any value.

4. The apparatus of claim 1, wherein the dummy picture is prohibited from use as an inter-view reference for the picture, and wherein only parsed syntax values corresponding to the dummy picture are used to decode the picture.

5. The apparatus of claim 1, wherein said decoder omits a given inter-view reference picture for the picture from a reference picture list, when the picture is capable of being decoded without a complete sample reconstruction of the given inter-view reference picture.

6. The apparatus of claim 5, wherein said decoder determines whether the picture is capable of being decoded without the complete sample reconstruction of the given inter-view reference picture based upon at least one high level syntax element.

7. The apparatus of claim 5, wherein said decoder decodes the picture using decoded syntax of the given inter-view reference picture as a prediction for the picture.

8. A method, comprising:
decoding a picture corresponding to at least one view of at least two views of multi-view video content, wherein the picture is decoded in support of decoded picture buffer management for single loop decoding using inter-view prediction, wherein said decoding step comprises generating a dummy picture for storage in a decoded picture buffer in support of the decoded picture buffer management, the dummy picture generated for a particular inter-view reference picture from among at least one of non-anchor pictures and anchor pictures of a reference view.

9. The method of claim 8, wherein the at least one view is a current view, the at least two views include the reference view with respect to the current view, and wherein the at least one view is capable of being reconstructed without a complete sample reconstruction of at least one of the non-anchor pictures and the anchor pictures of the reference view.

10. The method of claim 8, wherein a sample value of the dummy picture is settable to any value.

11. The method of claim 8, wherein the dummy picture is prohibited from use as an inter-view reference for the picture, and wherein only parsed syntax values corresponding to the dummy picture are used to decode the picture.

12. The method of claim 8, wherein said decoding step comprises omitting a given inter-view reference picture for the picture from a reference picture list, when the picture is capable of being decoded without a complete sample reconstruction of the given inter-view reference picture.

13. The method of claim 12, wherein said decoding step comprises determining whether the picture is capable of being decoded without the complete sample reconstruction of the given inter-view reference picture based upon at least one high level syntax element.

14. The method of claim 12, wherein said decoding step decodes the picture using decoded syntax of the given inter-view reference picture as a prediction for the picture.

15. The apparatus of claim 1, wherein the at least one view is a current view, the at least two views include the reference view with respect to the current view, and wherein the at least one view is capable of being reconstructed without a complete sample reconstruction of the anchor pictures of the reference view.

16. The method of claim 8, wherein the at least one view is a current view, the at least two views include the reference view with respect to the current view, and wherein the at least one view is capable of being reconstructed without a complete sample reconstruction of the anchor pictures of the reference view.

17. The apparatus of claim 1, wherein the dummy picture is prohibited from use as an inter-view reference for the picture, and wherein only parsed syntax values corresponding to at least motion information for the dummy picture are used to decode the picture.

18. The method of claim 8, wherein the dummy picture is prohibited from use as an inter-view reference for the picture, and wherein only parsed syntax values corresponding to at least motion information for the dummy picture are used to decode the picture.

* * * * *